Aug. 19, 1969

D. STUBBINS 3,461,767

ROTARY SHEAR

Filed Feb. 16, 1966

INVENTOR
DEREK STUBBINS

BY Henry C. Westin

HIS ATTORNEY

Aug. 19, 1969        D. STUBBINS        3,461,767
ROTARY SHEAR

Filed Feb. 16, 1966        3 Sheets-Sheet 2

INVENTOR
DEREK STUBBINS

BY Henry C. Westin
HIS ATTORNEY

United States Patent Office 3,461,767
Patented Aug. 19, 1969

3,461,767
ROTARY SHEAR
Derek Stubbins, Crosspool, Sheffield, England, assignor to Davy and United Engineering Company Limited, Sheffield, England
Filed Feb. 16, 1966, Ser. No. 527,953
Claims priority, application Great Britain, Feb. 18, 1965, 7,032/65
Int. Cl. B26d 1/24
U.S. Cl. 83—344     5 Claims

ABSTRACT OF THE DISCLOSURE

The disclosure of this invention relates to a rotary flying shear having two drums in which a leading knife is carried by one of the drums and is driven by a motor. The other drum carries a trailing knife and is driven through gearing associated with the first drum. The drums are supported by separate shafts and eccentrics are associated with one of the shafts for moving that shaft relative to the other shaft in order to vary the separation between the drums.

---

This invention relates to a rotary shear of the kind having two oppositely rotating drums and carrying knives which co-operate to shear material passing between the drums.

The knives of such shears are usually secured to the periphery of the drums and are arranged so that when the drums are rotated the cutting edges of the knives effect the shearing operation. This operation requires that the knives have a radial and lateral clearance one from another. During operation of such a shear, gearing whereby one drum is driven synchronously by the other may become sufficiently worn to alter the lateral clearance of the knives deleteriously and this invention is concerned with restoring the clearance.

In certain known rotary shears the separation of the drums can be adjusted using shims. However, this involves among other operations both dismantling part of the shear and sizing new shims and is highly time consuming.

The present invention provides a rotary shear having two oppositely rotatable drums carrying knives which co-operate to shear material passing between them, in which shear the drums are mounted on shafts and a shaft moving mechanism is provided which is operatively connected to a said shaft whereby the shaft can be moved relatively to the other shaft so that the drum separation can be varied.

The present rotary shear thus does not rely upon shims to set the drum separation and can be constructed to obviate the need for dismantling.

The invention can be applied, inter alia, to a shear of which the first drum carrying the leading knife is driven by a power source and the second drum carrying the trailing knife is driven by the first drum. Preferably in such an arrangement the second drum shaft is movable toward or away from the first.

In one form of shear according to the invention, the shaft moving mechanism includes means in which the said shaft is mounted eccentrically, the means being turnable to move the said shaft toward or away from the other shaft. The said means in which the shaft is mounted can be a sleeve and one or more such sleeves can be used in relation to a single associated shaft.

The following description relates to the drawings accompanying the provisional specification which show by way of example only, a rotary shear according to the invention.

Figure 1:
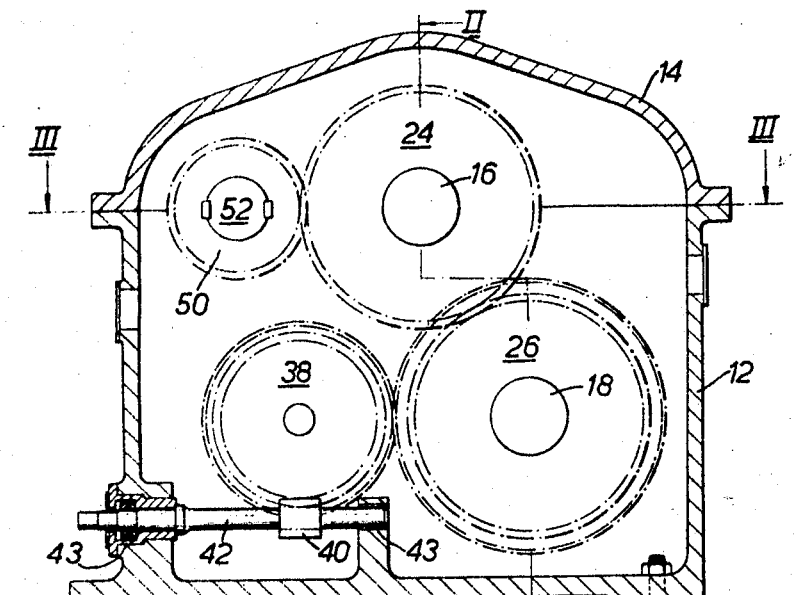
Figure 2:
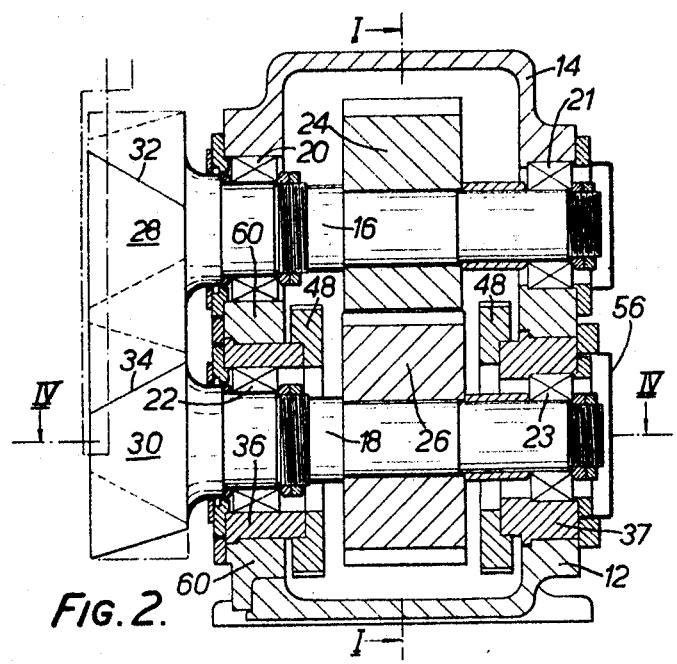
Figure 3:
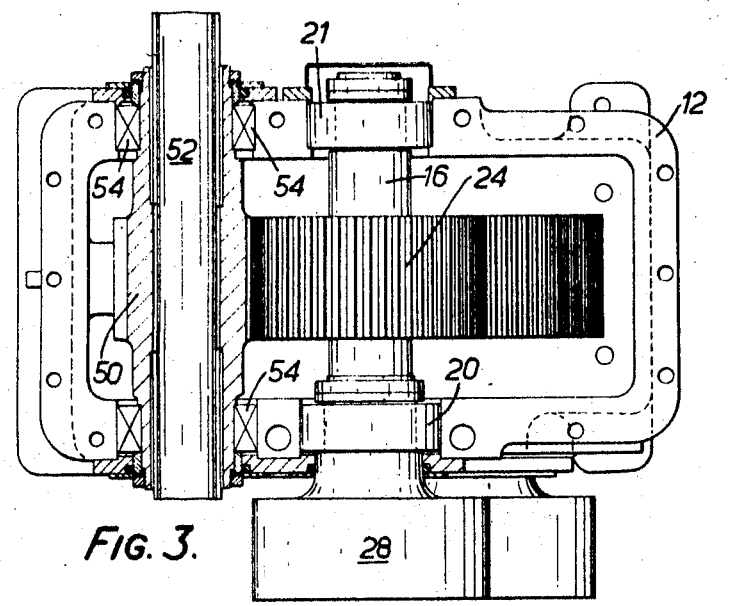
Figure 4:
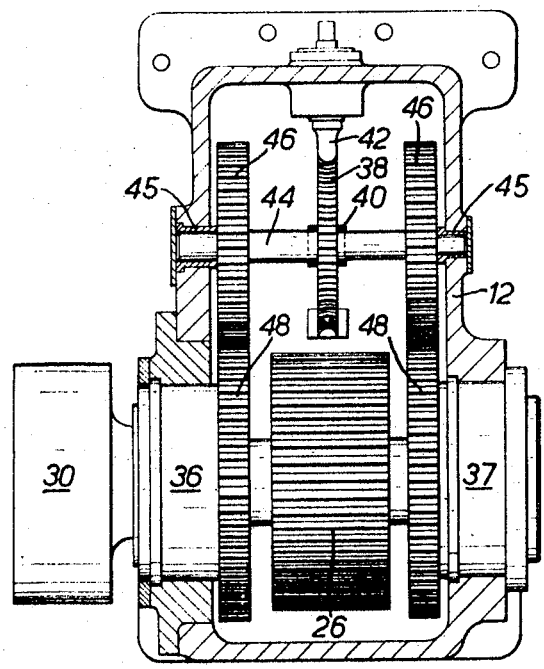
Figure 5:
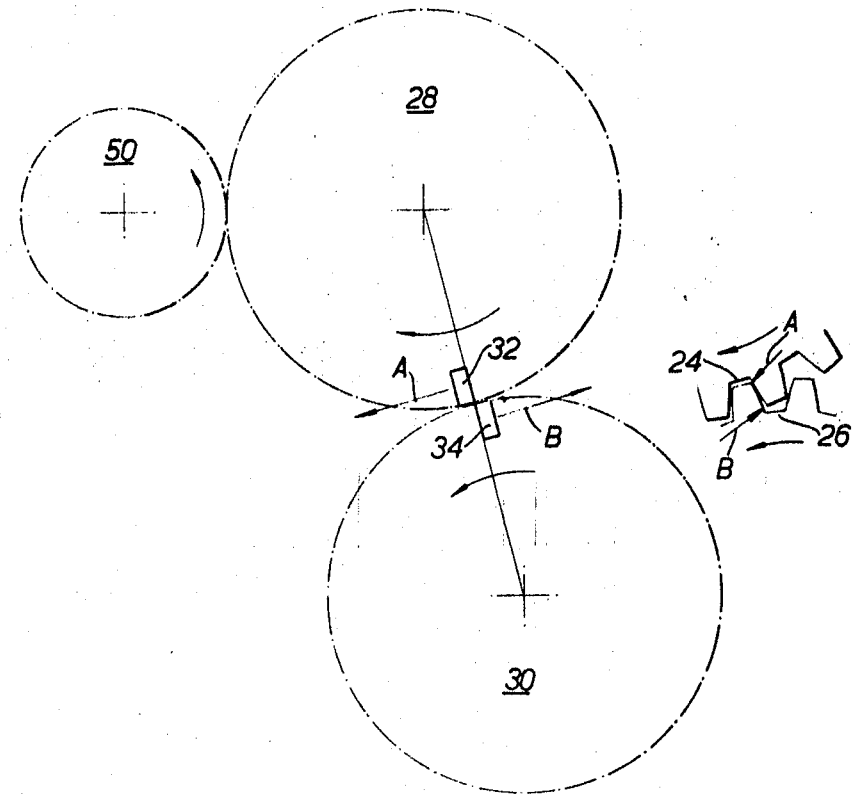

Of the drawings:
FIGURE 1 is a section on the line I—I in FIGURE 2,
FIGURE 2 is a section on the line II—II in FIGURE 1,
FIGURE 3 is a section on the line III—III in FIGURE 1,
FIGURE 4 is a section on the line IV—IV in FIGURE 2, and
FIGURE 5 is a diagram showing the effect of the separating force.

In the drawings a casing 12 having a removable cover 14 houses upper and lower arbors 16 and 18 respectively, rotatably supported in bearings 20, 21 and 22, 23. The arbors carry intermeshing gears 24 and 26, and drums 28 and 30 which themselves support shear knives indicated at 32 and 24, FIGURE 2. The bearings 22, 23 of the lower arbor 18 are carried in bores eccentrically arranged with respect to the outer peripheries of sleeves 36, 37 the sleeves themselves being rotatably supported in bores in the casing 12 and arranged to be turned by a worm wheel 38 driven by a worm 40 on a shaft 42 supported in bearings 43 in the casing 12.

The worm wheel 38 is carried on a shaft 44, (FIGURE 4) supported in bearings 45 in the casing 12, and carrying pinions 46 each engaging a pinion 48 secured to each sleeve 36, 37.

The shaft 42 extends outside the casing and can be rotated to cause the sleeves 36, 37 to turn so as to adjust the lower arbor towards or away from the upper arbor, thereby allowing the cylindrical arcs described by the knives on the drum to be set in the correct relationship, and also allowing periodic adjustment of the back-lash between the gears 24, 26 to compensate for wear.

The upper arbor 16 is driven by a pinion 50 (FIGURES 1 and 3) slidably but non-rotatably secured to a main drive shaft 52 carried in bearings 54 in the casing 12.

When it is desired to remove the arbors and drums for maintenance purposes, the upper arbor 16 can easily be removed by first removing the cover 14 of the casing 12, when the arbor together with its bearings and pinion gear can be lifted out.

The bearing supports of the lower arbor 18 are arranged so that the arbor together with the drum supports can be removed to the left in FIGURE 2. To do this, the cover 56 (FIGURE 2) is first removed, the front cartridge housing 60 is released from the casing 12, and the drum, arbor and its bearing assemblies can then be withdrawn. This arrangement facilitates maintenance of the shear.

Referring now to FIGURE 5 which shows the relative positions of the co-operating knives 32 and 34 during the shearing operation, the leading knife 32 is carried on the drum 28 which is driven by the pinion 50, whilst the trailing knife 34 is carried on the drum 30 which is driven by the pinion 24. The arrows A and B each indicate the separating force acting on the knife 32 and the knife 34, respectively, when material is being sheared. The pinions 24 and 26 are represented in this figure and the arrows A and B are shown thereon. It will be seen that there is space, between engaged teeth of the pinions 24 and 26, which potentially allows relative movement between the pinions. However, the separating force acting on the trailing knife 34 carried on the drum 30 maintains the gears in the driving condition and does not cause any movement of the gear 26 relative to the gear 24 in a direction of rotation so that the take-up by the gear 26 of the essential back-lash between the gears, as would be experienced if the trailing knife were carried on the drum 28, is avoided. The separating force therefore, is only effective to separate the knives to the extent permitted by the elasticity of the drum assemblies and their supports. With this arrangement the clearance setting of the knives is better maintained during the shearing operation, and the need for maintenance of the knives themselves is reduced.

In accordance with the provisions of the patent statutes, I have explained the principle and operation of my invention and have illustrated and described what I consider to represent the best embodiment thereof.

I claim:
1. A rotary shear having spaced apart first and second rotatable drums,
   a leading knife carried by said first drum and power means for driving said first drum,
   a trailing knife carried by said second drum and means for connecting said second drum with said first drum so that the second drum is driven by said first drum,
   said knives being arranged to cooperate to shear material passing between said drums,
   said first and second drums being mounted on first and second shafts respectively,
   a shaft moving mechanism operatively connected to said second shaft whereby said second shaft can be moved towards and away from the first shaft so that the separation between the drums can be varied.
2. A rotary shear according to claim 1 wherein the shaft moving mechanism includes means in which the said shaft is mounted eccentrically and which is turnable to move the said shaft toward or away from the other shaft.
3. A rotary shear according to claim 2 wherein the means in which the said shaft is mounted comprises a sleeve.
4. A rotary shaft according to claim 3 wherein more than one sleeve in which the said shaft is mounted is provided.
5. A rotary shear according to claim 2 wherein the means, in which the said shaft is mounted, is turned by a pinion secured thereto which is turned by a driven pinion.

References Cited

UNITED STATES PATENTS

| | | | |
|---|---|---|---|
| 391,949 | 10/1888 | Cottrell | 83—674 X |
| 2,397,603 | 4/1946 | Hackett | 83—344 X |
| 2,711,935 | 6/1955 | Miles | 308—62 |
| 2,756,821 | 7/1956 | Phipps | 83—345 |
| 3,057,239 | 10/1962 | Teplitz | 83—337 |

ANDREW R. JUHASZ, Primary Examiner